US012058534B2

(12) United States Patent
Liu et al.

(10) Patent No.: US 12,058,534 B2
(45) Date of Patent: Aug. 6, 2024

(54) METHOD OF MEASURING AAS EMF (71) Applicant: Telefonaktiebolaget LM Ericsson (publ), Stockholm (SE)

(72) Inventors: Weihong Liu, Kanata (CA); Guoqiang Lu, Ottawa (CA); Edward Mah, Kanata (CA); Daryl Smith, Gloucester (CA); Dimple Thomas, Ottawa (CA); Guoqiang Xue, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 361 days.

(21) Appl. No.: 17/624,691

(22) PCT Filed: Jun. 30, 2020

(86) PCT No.: PCT/IB2020/056182
§ 371 (c)(1),
(2) Date: Jan. 4, 2022

(87) PCT Pub. No.: WO2021/005454
PCT Pub. Date: Jan. 14, 2021

(65) Prior Publication Data
US 2022/0264319 A1 Aug. 18, 2022

Related U.S. Application Data

(60) Provisional application No. 62/870,944, filed on Jul. 5, 2019.

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0617* (2013.01); *H04B 17/318* (2015.01); *H04W 24/10* (2013.01)

(58) Field of Classification Search
CPC ...... H04B 7/0617; H04B 7/10; H04B 17/318; H04W 16/28; H04W 24/10
See application file for complete search history.

(56) References Cited

U.S. PATENT DOCUMENTS 7,388,538 B1 * 6/2008 Thompson, III ...... G01S 5/0018
342/357.36
7,468,706 B2 * 12/2008 Andersson ................ G01S 3/48
343/757

(Continued)

FOREIGN PATENT DOCUMENTS

CA 3099603 A1 * 11/2019 ........... H04B 17/102
CN 1726616 A * 1/2006 ............... G01S 3/04

(Continued)

OTHER PUBLICATIONS

Kuriyama et al., Antenna Pattern Evaluation of 28GHz band Massive MIMO Antenna RF Frontend Module for 5G, 2019, 2019 IEEE International Symposium on Antennas and Propagation and USNC-URSI Radio Science Meeting, Atlanta, GA, USA, pp. 609-610, doi: 10.1109/APUSNCURSINRSM.2019.8889340 (Year: 2019).*

(Continued)

*Primary Examiner* — Eric Nowlin
(74) *Attorney, Agent, or Firm* — Sage Patent Group (57) ABSTRACT

Embodiments of a method for measurement of electromagnetic field strength at a point of interest in a coverage area of a 2-dimensional (2D) active antenna system (AAS). The 2D AAS transmits with a load factor of 100 percent. The 2D AAS sweeps a predefined range of azimuth and elevation angles, and azimuth and elevation directions which yield highest EMF at the point of interest are determined. First beamforming weights are determined based on the azimuth and elevation directions and the 2D AAS caused to apply the first beamforming weights. The 2D AAS sweeps a co-phasing angle from 0 to 360 degrees, and a co-phasing angle (Continued)

which yields highest EMF is determined. Second beamforming weights are determined based on azimuth and elevation directions and the co-phasing angle, and the 2D AAS caused to apply the second beamforming weights. The EMF strength at the point of interest is measured.

9 Claims, 9 Drawing Sheets

(51) Int. Cl.
*H04B 17/318* (2015.01)
*H04W 24/10* (2009.01)

(56) References Cited

U.S. PATENT DOCUMENTS

| | | | | |
|---|---|---|---|---|
| 7,548,189 B2* | 6/2009 | Alon | G01S 13/4418 | 342/149 |
| 7,642,961 B1* | 1/2010 | Rausch | H04B 17/27 | 342/367 |
| 7,924,225 B2* | 4/2011 | Mak | G01S 3/18 | 343/835 |
| 9,157,983 B2* | 10/2015 | Karlsson | G01S 3/74 | |
| 9,265,066 B2* | 2/2016 | Goodwin | H04W 72/52 | |
| 9,564,957 B2* | 2/2017 | Balraj | H04W 72/23 | |
| 9,786,999 B2* | 10/2017 | Kyosti | H01Q 25/00 | |
| 10,128,929 B2* | 11/2018 | Wich | H04B 7/0413 | |
| 10,151,783 B2* | 12/2018 | Ndip | H04B 17/13 | |
| 10,209,284 B2* | 2/2019 | Gienger | G01R 27/04 | |
| 10,236,592 B2* | 3/2019 | Gok | H01Q 21/00 | |
| 10,284,313 B2* | 5/2019 | Abdelmonem | H04L 25/08 | |
| 10,594,416 B2* | 3/2020 | Abdelmonem | H04L 27/2647 | |
| 10,644,903 B2* | 5/2020 | Shin | H04L 5/0023 | |
| 10,763,940 B2* | 9/2020 | Banu | H04B 7/0686 | |
| 10,797,807 B2* | 10/2020 | Vella-Coleiro | H04B 17/21 | |
| 10,812,121 B2* | 10/2020 | Abdelmonem | H04B 17/373 | |
| 10,833,783 B2* | 11/2020 | Abdelmonem | H04W 24/08 | |
| 10,833,824 B2* | 11/2020 | Jalali | H04B 17/318 | |
| 10,866,299 B2* | 12/2020 | An | H04W 16/28 | |
| 11,054,452 B2* | 7/2021 | Brigance | G01R 29/0821 | |
| 11,108,475 B2* | 8/2021 | Chapman | H04B 7/0617 | |
| 11,131,701 B1* | 9/2021 | Mathis | G01R 29/105 | |
| 11,152,717 B2* | 10/2021 | Kyosti | H01Q 25/00 | |
| 11,165,523 B2* | 11/2021 | Xue | H04B 17/3912 | |
| 11,206,555 B2* | 12/2021 | Wang | H04L 41/16 | |
| 11,503,548 B2* | 11/2022 | Pei | H04W 52/223 | |
| 11,626,922 B2* | 4/2023 | Facca | H04B 17/318 | 455/7 |
| 11,677,140 B2* | 6/2023 | Stoleru | H01Q 3/24 | 343/705 |
| 11,879,924 B2* | 1/2024 | Wen | G01R 29/0892 | |
| 11,902,903 B2* | 2/2024 | Thorebäck | H04W 52/367 | |
| 2005/0134505 A1* | 6/2005 | McCleary | H01Q 25/007 | 342/368 |
| 2006/0071866 A1* | 4/2006 | Andersson | G01S 3/48 | 343/705 |
| 2008/0042896 A1* | 2/2008 | Alon | G01S 7/4026 | 342/194 |
| 2009/0315759 A1* | 12/2009 | Mak | H01Q 21/28 | 342/147 |
| 2011/0189962 A1* | 8/2011 | Kyosti | H04B 17/3912 | 455/67.11 |
| 2011/0191090 A1* | 8/2011 | Kyosti | H04B 17/3912 | 703/13 |
| 2014/0104110 A1* | 4/2014 | Karlsson | G01S 3/74 | 342/434 |
| 2014/0133421 A1* | 5/2014 | Goodwin | H04W 72/52 | 370/329 |
| 2016/0191176 A1* | 6/2016 | O'Keeffe | H04B 17/00 | 455/63.4 |
| 2016/0269092 A1* | 9/2016 | Wich | H03F 3/24 | |
| 2017/0181010 A1* | 6/2017 | Burgess | H04W 72/12 | |
| 2018/0088162 A1* | 3/2018 | Ndip | H04B 17/27 | |
| 2018/0205577 A1* | 7/2018 | Shin | H04L 5/0048 | |
| 2019/0004102 A1* | 1/2019 | Gienger | H01Q 3/247 | |
| 2019/0004139 A1* | 1/2019 | Zhang | G02B 27/09 | |
| 2019/0036578 A1* | 1/2019 | Zirwas | H04B 7/0469 | |
| 2019/0052294 A1* | 2/2019 | Abdelmonem | H04W 52/223 | |
| 2019/0052381 A1* | 2/2019 | Abdelmonem | H04B 17/336 | |
| 2019/0173593 A1* | 6/2019 | Chapman | H04B 17/12 | |
| 2019/0222329 A1* | 7/2019 | Abdelmonem | H04B 1/1036 | |
| 2019/0288762 A1* | 9/2019 | Banu | H04B 7/0686 | |
| 2020/0096596 A1* | 3/2020 | An | G01S 3/72 | |
| 2020/0106582 A1* | 4/2020 | Jalali | H04B 17/318 | |
| 2020/0119785 A1* | 4/2020 | Varatharaajan | H04B 7/0617 | |
| 2020/0177292 A1* | 6/2020 | Abdelmonem | H04J 11/0026 | |
| 2020/0220628 A1* | 7/2020 | Vella-Coleiro | G01R 29/105 | |
| 2020/0351678 A1* | 11/2020 | Wang | H04L 41/16 | |
| 2021/0018547 A1* | 1/2021 | Brigance | G01R 29/0821 | |
| 2021/0203425 A1* | 7/2021 | Xue | H04B 17/0085 | |
| 2021/0329416 A1* | 10/2021 | Li | H04W 64/00 | |
| 2021/0345252 A1* | 11/2021 | Pei | H04B 7/0617 | |
| 2022/0085491 A1* | 3/2022 | Stoleru | H01Q 21/28 | |
| 2022/0085868 A1* | 3/2022 | Facca | H01Q 3/04 | |
| 2022/0166478 A1* | 5/2022 | Wigren | H04W 72/0473 | |
| 2023/0017555 A1* | 1/2023 | Jidhage | G01R 29/10 | |
| 2023/0128635 A1* | 4/2023 | El-Keyi | H04B 7/0426 | 370/318 |
| 2023/0146081 A1* | 5/2023 | Da Silveira | H01Q 21/0006 | 342/372 |
| 2023/0180139 A1* | 6/2023 | Thorebäck | H04B 17/12 | 455/522 |

FOREIGN PATENT DOCUMENTS

| | | | | |
|---|---|---|---|---|
| EP | 2347531 B1 * | 9/2013 | | G01R 29/08 |
| EP | 3704815 B1 * | 8/2021 | | H04B 17/0085 |
| EP | 3968456 A1 * | 3/2022 | | H01Q 1/28 |
| FR | 2978249 A1 * | 1/2013 | | G01R 29/10 |
| RU | 2624449 C1 * | 7/2017 | | |
| WO | WO-2010040887 A1 * | 4/2010 | | G01R 29/08 |
| WO | WO-2010040889 A1 * | 4/2010 | | G01R 29/08 |
| WO | WO-2012109484 A1 * | 8/2012 | | H01Q 1/2291 |
| WO | WO-2015094155 A1 * | 6/2015 | | H04B 7/0417 |
| WO | WO-2017008268 A1 * | 1/2017 | | |
| WO | WO-2019032581 A1 * | 2/2019 | | H04B 1/1036 |
| WO | WO-2019086945 A1 * | 5/2019 | | H04B 17/0085 |
| WO | WO-2020027894 A1 * | 2/2020 | | H04B 1/0475 |
| WO | WO-2021115599 A1 * | 6/2021 | | G01R 29/0871 |
| WO | WO-2021209791 A1 * | 10/2021 | | H01Q 1/246 |
| WO | WO-2022010600 A1 * | 1/2022 | | H04B 7/0404 |
| WO | WO-2022262956 A1 * | 12/2022 | | H01Q 1/246 |
| WO | WO-2023216211 A1 * | 11/2023 | | H04B 17/12 |
| WO | WO-2023233006 A1 * | 12/2023 | | |

OTHER PUBLICATIONS

Zhang et al., Virtual Large-Scale Array Beamforming Analysis Using Measured Subarray Antenna Patterns, 2017, IEEE Access, vol. 5, pp. 19812-19823, doi: 10.1109/ACCESS.2017.2737655 (Year: 2017).*

Uesaka et al., The planar array antenna with two-dimensional radiation pattern reconfigurable elements, 2016, 2016 International Symposium on Antennas and Propagation (ISAP), Okinawa, Japan, pp. 1062-1063. (Year: 2016).*

Kyösti et al., On Dimensions of OTA Setups for Massive MIMO Base Stations Radiated Testing, 2016, IEEE Access, vol. 4, pp. 5971-5981, doi: 10.1109/ACCESS.2016.2610721 (Year: 2016).*

Nadeem et al., Elevation Beamforming With Full Dimension MIMO Architectures in 5G Systems: A Tutorial, 2019, IEEE Communications Surveys & Tutorials, vol. 21, No. 4, pp. 3238-3273, Fourthquarter 2019, doi: 10.1109/COMST.2019.2930621. (Year: 2019).*

Bluetest, "TP to TR 38.810—Reverberation Chamber Alternative Test Method", 3GPP TSG-RAN WG4 Meeting #86, R4-1803576, Athens, Greece, Feb. 26-Mar. 2, 2018.

(56) References Cited

OTHER PUBLICATIONS

International Search Report and Written Opinion issued on corresponding PCT Application No. PCT/IB2020/056182.

* cited by examiner

METHOD OF MEASURING AAS EMF

TECHNICAL FIELD

The present disclosure relates to in-field measurement of electromagnetic field (EMF) of an advanced antenna system (AAS).

BACKGROUND

ISED (Innovation, Science and Economic Development Canada, the regulatory body in Canada) is asking wireless carriers and network equipment vendors to develop a test and measurement procedure to measure in the field the EMF (Electromagnetic Field) strength from a massive MIMO AAS system. This is in support of ensuring EMF safety limits With traditional antenna systems, the antenna pattern is fixed, as long as the radio is loaded up with traffic, simply putting an EMF probe somewhere in the sector, an EMF level can be read. But with AAS systems, the antenna pattern is not fixed with multiple different beams being formed either via analog or digital beam forming.

The proposal requested by ISED involves finding a point in space where the EMF is largest from other sources (other cellular radios and broadcast towers and such) somewhere in the AAS sector. It is then desired to point all possible energy from the AAS antenna to that point in space. The beam would need to be locked to that position for the duration of the test measurement (minutes long).

It is non-trivial to fulfill the above requirements in a live network, especially when user equipment (UE, mobile terminal) cannot be used. With 4G or 5G technologies where AAS are widely deployed, time and frequency resources are shared by multiple UEs dynamically on a per mini-second basis, there is no easy way to guarantee all subcarriers (frequency resources) and time slots (time resources) are allocated to one UE for duration of minutes.

Often the EMF measurement is performed at the time right after completion of AAS radio/antenna installation, at which time end-to-end network connectivity is not yet in place. Hence it is not possible to use a phone (UE) to generate full buffer traffic such that the AAS radio unit transmits at full power.

SUMMARY

An aspect of the present invention provides a method for in-the-field measurement of electromagnetic field strength at a point of interest in a coverage area of a 2-dimensional (2D) active antenna system (AAS). The 2D AAS is caused to transmit with a load factor of 100 percent. The 2D AAS sweeps a predefined range of azimuth angles, and an azimuth direction $\theta_0$ which yields highest EMF at the point of interest is determined. The 2D AAS is caused to sweep a predefined range of elevation angles, and an elevation angle $\varphi_0$ which yields highest EMF at the point of interest is determined. First beamforming weights are determined based on $\theta_0$ and $\varphi_0$, and the 2D AAS caused to apply the first beamforming weights. The 2D AAS is caused to sweep a co-phasing angle from 0 to 360 degrees, and a co-phasing angle $\phi_0$ which yields highest EMF is determined. Second beamforming weights are determined based on $\theta_0$, $\varphi_0$ and $\phi_0$, and the 2D AAS caused to apply the second beamforming weights. The EMF strength at the point of interest is measured.

Embodiments of a system are also disclosed.

BRIEF DESCRIPTION OF THE DRAWINGS

The accompanying drawing figures incorporated in and forming a part of this specification illustrate several aspects of the disclosure, and together with the description serve to explain principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

At least some of the following abbreviations and terms may be used in this disclosure.

2D Two Dimensional
3D Three-Dimensional
3GPP Third Generation Partnership Project
5G Fifth Generation
AAS Advanced Antenna System
AoA Angle of Arrival
AoD Angle of Departure
ASIC Application Specific Integrated Circuit
BF Beamforming
BLER Block Error Rate
BW Beamwidth
CPU Central Processing Unit
CSI Channel State Information
dB Decibel
DCI Downlink Control Information DFT Discrete Fourier Transform
DSP Digital Signal Processor
eNB Enhanced or Evolved Node B
FIR Finite Impulse Response
FPGA Field Programmable Gate Array
gNB New Radio Base Station
ICC Information Carrying Capacity
IIR Infinite Impulse Response
LTE Long Term Evolution
MIMO Multiple Input Multiple Output
MME Mobility Management Entity
MMSE Minimum Mean Square Error
MTC Machine Type Communication
NR New Radio
OTT Over-the-Top
PBCH Physical Broadcast Channel
PDCCH Physical Downlink Control Channel
PDSCH Physical Downlink Shared Channel
P-GW Packet Data Network Gateway
RAM Random Access Memory
ROM Read Only Memory
RRC Radio Resource Control
RRH Remote Radio Head
SCEF Service Capability Exposure Function
SINR Signal to Interference plus Noise Ratio
TBS Transmission Block Size
UE User Equipment
ULA Uniform Linear Array
URA Uniform Rectangular Array Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Cell: As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

Note that references in this disclosure to various technical standards (such as 3GPP TS 38.211 V15.1.0 (2018-03) and 3GPP TS 38.214 V15.1.0 (2018-03), for example) should be understood to refer to the specific version(s) of such standard(s) that is(were) current at the time the present application was filed, and may also refer to applicable counterparts and successors of such versions.

The description herein focuses on a 3GPP cellular communications system and, as such, 3GPP terminology or terminology similar to 3GPP terminology is oftentimes used. However, the concepts disclosed herein are not limited to a 3GPP system.

Figure 1:
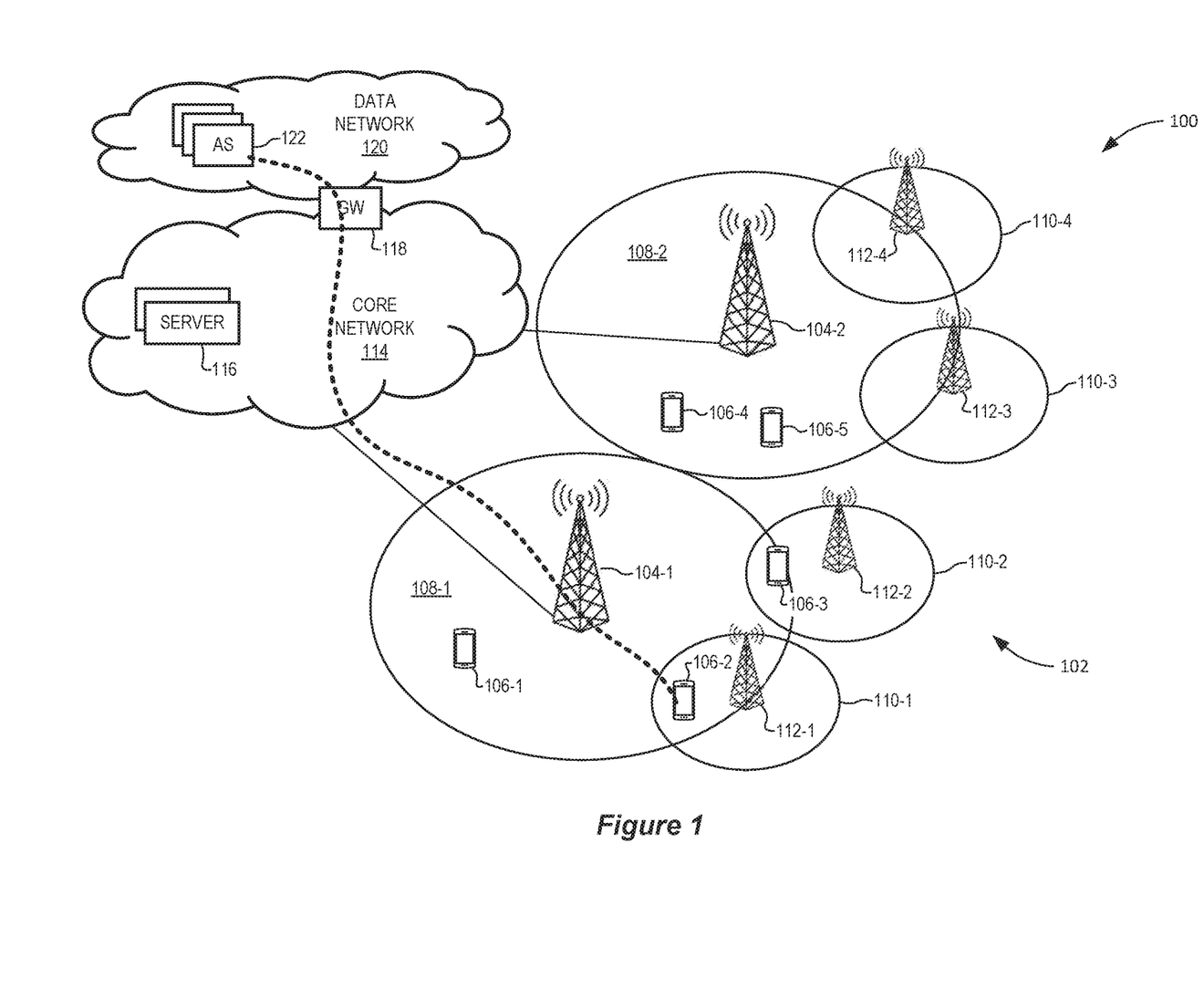
FIG. 1 is a block diagram schematically illustrating a representative network in which embodiments of the present invention may be deployed.

FIG. 1 illustrates one example of a cellular communications network 100 in which embodiments of the present disclosure may be implemented. In the embodiments described herein, the cellular communications network 100 is a Public Land Mobility Network (PLMN) conforming to one or more of the LTE, 3G, 4G and 5G NR standards, or their successors. In the illustrated example, the cellular communications network 100 includes a (Radio) Access Network ((R)AN) 102 comprising base stations 104-1 and 104-2 controlling radio communications with wireless devices 106-1, 106-2, 106-3, 106-4, 106-5 within corresponding macro cells 108-1 and 108-2. Each macro cell 108 may be defined by any suitable combination of geography, frequency, Radio Access Technology (RAT) and modulation scheme.

Base stations 104 can be any type of network access device capable of establishing radio connection(s) with one or more wireless devices 106 within a respective coverage area of the base station 104 or low power node 112, and further configured to forward subscriber traffic between the core network 114 and the one or more wireless devices 106. An important feature of a base station 104 is that it is configured with both a radio interface configured to send and receive radio signals to and from a wireless device 106, and a network interface configured to exchange electronic and/or optical signals with the core network 114. Examples of base stations 104 and low power nodes 112 include: Evolved Node B (eNB) systems (known, for example, in the 3GPP standards): WiFi access points (known, for example from IEEE 802.11 standards) or the like. In some contexts, a base station 104 may be referred to as an access point (AP) regardless of the Radio Access Technology (RAT) that it supports.

The illustrated (R)AN 102 also includes small cells 110-1 through 110-4, within which radio communication can be controlled by corresponding low power nodes 112-1 through 112-4. As with the macro cells 108, each small cell may be defined by any suitable combination of geography, frequency, Radio Access Technology (RAT) and modulation scheme. As with the base stations 104, a low power node 112 can be any type of network access device capable of establishing radio connection(s) with one or more wireless devices 106 within a respective coverage area of the low power node 112, and further configured to forward subscriber traffic between the core network 114 and the one or more wireless devices 106. An important feature of a low power node 112 is that it is configured with both a radio interface configured to send and receive radio signals to and from a wireless device 106, and a network interface configured to exchange electronic and/or optical signals with the core network 114. In some embodiments, a low power node 112 may be connected to the core network 114 by a direct connection, such as an optical cable. In other embodiments, a low power node 112 may be connected to the core network 114 by an indirect connection, such as via a radio or optical fiber link to a base station 104. Examples of low power nodes 112 include: Remote Radio Heads (RRHs) connected to a base station or a network router (not shown): WiFi access points or the like. In some contexts, a low power node 112 may be referred to as an access point (AP) regardless of the specific Radio Access Technology (RAT) that it supports.

Notably, while not illustrated, a particular small cell 110 may alternatively be controlled by a base station 104, for example using a beam-forming technique. In such cases, the particular small cell 110 will not be associated with a respective low power node 112 per se. Rather, the particular small cell 110 will be associated with a respective set of parameters implemented in the base station 104. In this disclosure, the term "cell" is used to refer to a defined combination of parameters (such as geography, frequency, Radio Access Technology (RAT), modulation scheme, identifiers and the like) that can be used by a wireless device 106 to access communication services of the network 100. The term "cell" does not imply any particular parameter values, or any particular physical configuration of devices needed to enable a wireless device 106 to access those communication services.

Wireless devices 106 can be any type of device capable of sending and receiving radio signals to and from a base station 104 and/or low power node 112. Examples of wireless device 106 include cellular phones, Personal Data Assistants (PDAs), mobile computers, Internet of Things (IoT) devices, autonomous vehicle controllers, and the like. In some contexts, a wireless device 106 may be referred to as a User Equipment (UE) or a mobile device.

In some embodiments, the macro cells 108-1 and 108-2 may overlap each other, and may also overlap one or more small cells 110. For example, a particular macro cell 108-1 may be one macro cell 108 among a plurality of macro cells covering a common geographical region and having a common RAT and modulation scheme, but using respective different frequencies and/or AP identifiers. In such cases, a wireless device 106 located within a region covered by two or more overlapping cells 108, 112 may send and receive radio signals to and from each of the corresponding base stations 104 and/or low power nodes 112.

In the illustrated example, the (R)AN 102 is connected to a Core Network (CN) 114, which may also be referred to as Evolved Core Network (ECN) or Evolved Packet Core (EPC). The CN 114 includes (or, equivalently, is connected to) one or more servers 116 configured to provide networking services such as, for example, Network Functions (NFs) described in 3GPP TS 23.501 V15.2.0 (2018-06) "System Architecture for the 5G System" and its successors. The CN 114 also includes one or more gateway (GW) nodes 118 configured to connect the CN 114 to a packet data network (DN) 120 such as, for example, the internet. A gateway node 118 may be referred to as a packet gateway (PGW) and/or a serving gateway (SGW). The DN 120 may provide communications services to support end-to-end communications between wireless devices 106 and one or more application servers (as) 122 configured to exchange data packet flows with the wireless devices 106 via the CN 114 and (R)AN 102. In some contexts, an application server (AS) 122 may also be referred to as a host server.

In some contexts, an end-to-end signal path between an AS 122 and one or more wireless devices 106 may be referred to as an Over-The-Top (OTT) connection. Similarly, a communication service that employs signal transmission between an AS 122 and one or more wireless devices 106 may be referred to as an OTT service.

It should be appreciated that the separation between the CN 114 and the DN 120 can be purely logical, in order to simplify understanding of their respective roles. In particular, the CN 114 is primarily focused on providing wireless device access services and supporting wireless device mobility. On the other hand, the DN 120 is primarily focused on providing end-to-end communications, particularly across network domains. However, it will be appreciated that both the CN 114 and the DN 120 can be implemented on common physical network infrastructure, if desired.

Figure 2A:
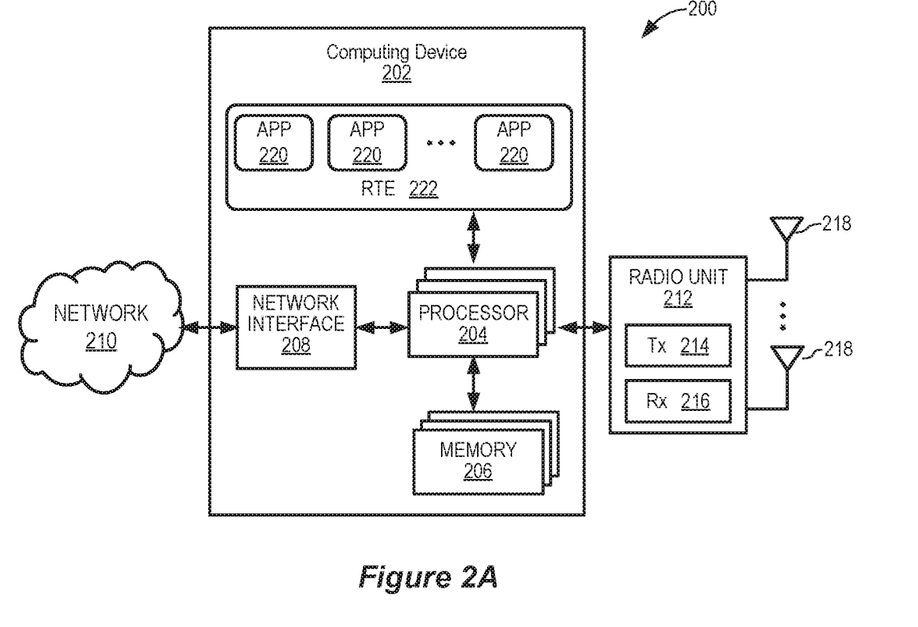
FIGS. 2A and 2B are block diagrams schematically illustrating examples of a computing device usable in embodiments of the present invention.
Figure 2B:
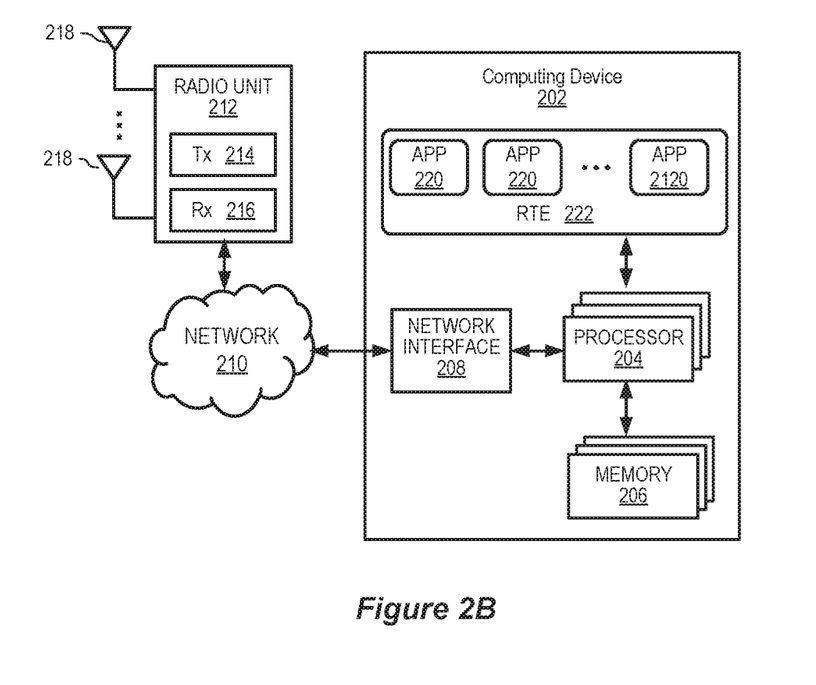

FIGS. 2A and 2B are block diagrams schematically illustrating a communications system 200 including a computing device 202 usable in embodiments of the present invention. In various embodiments, any or all of the base stations 104 or 112, wireless devices 106, core network servers 116 or gateways 118 and data network servers 122 may be implemented using systems and principles in accordance with the computing device 202. It may also be appreciated that any or all of the elements of the network 100 may be virtualized using techniques known in the art or developed in the future, in which case the functions of any or all the base stations 104 or 112, core network servers 116 or gateways 118 may be implemented by suitable software executing within a computing device 202 or within a data center (non shown) composed of multiple computing devices 202.

In the example of FIG. 2A, the communications system 200 generally includes computing device 202 connected to one or more networks 210 and one or more radio units 212. The computing device 202 includes one or more processors 204, a memory 206, one or more network interfaces 208. The processors 204 may be provided as any suitable combination of Central Processing Units (CPUs), Application Specific Integrated Circuits (ASICs), Field Programmable Gate Arrays (FPGAs), or the like. Similarly, the memory 206 may be provided as any suitable combination of Random Access Memory (RAM), Read Only Memory (ROM) and mass storage technologies such as magnetic or optical disc storage or the like. The network interfaces 208 enable signaling between the computing device 200 and the networks 210, such as the Core Network 114, the data network 120, or a private domain network such as a data center (not shown).

Each radio unit 212 typically includes at least one transmitter (Tx) 214 and at least one receiver (Rx) 216 coupled to one or more antennas 218. In the example of FIG. 2A, the radio unit(s) 212 is(are) shown as being external to the computing device 202 and connected to the computing device 202 via a suitable physical connection (such as a copper cable or an optical cable). In the example of FIG. 2B, the radio unit(s) 212 is(are) shown as being connected to computing device 202 via a network 210 and a network interface 208. In still other embodiments, the radio unit(s) 212 and optionally also the antenna(s) 218 may be integrated together with the computing device 202.

The one or more processors 204 operate to provide functions of the computing device 202. Typically, these function(s) are implemented as software applications (APPs) 220 or modules that are stored in the memory 206, for example, and executed by the one or more processors 204. In some embodiments, one or more software applications or modules 220 may execute within a secure run-time environment (RTE) 222 maintained by an operating system (not shown) of the computing device 202.

It may be appreciated that specific embodiments may exclude one or more of the elements illustrated in FIGS. 2A and 2B. For example, a computing device 202 configured to implement a wireless device 106 may incorporate one or more processors 204, a memory 206, and one or more radio units 212, but may exclude a network interface 208. Conversely, a computing device 202 configured to implement a server 116 or 122 may include one or more processors 204, a memory 206, and one or more network interfaces 208, but may exclude radio units 212. A computing device 202 configured to implement a base station 104 or 112, on the other hand, will normally include one or more processors 204, a memory 206, and both radio units 212 and network interfaces 208.

Figure 3:
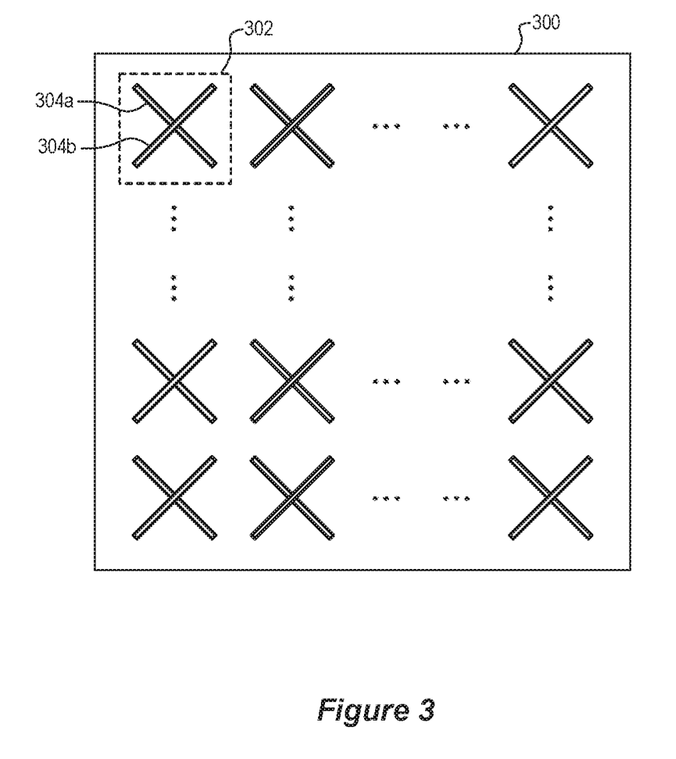
FIG. 3 is a block diagram schematically illustrating elements of a 2-dimensional (2D) active antenna system (AAS) usable in embodiments of the present invention.

FIG. 3 schematically illustrates elements of an example two-dimensional (2D) advanced antenna system (AAS) of a type that may be used in 5G NR radio units. Each antenna 218 in a radio unit 212 of a 4G or 5G base station 104 or 112 may be configured as a 2D AAS 300 of the type illustrated in FIG. 3. In the specific example of FIG. 3, the 2D directional AAS 300 may be composed of (R+1) rows, and (C+1) columns of antenna units 302, each of which includes a pair of cross-polarized antenna elements 304a and 304b.

Figure 4:
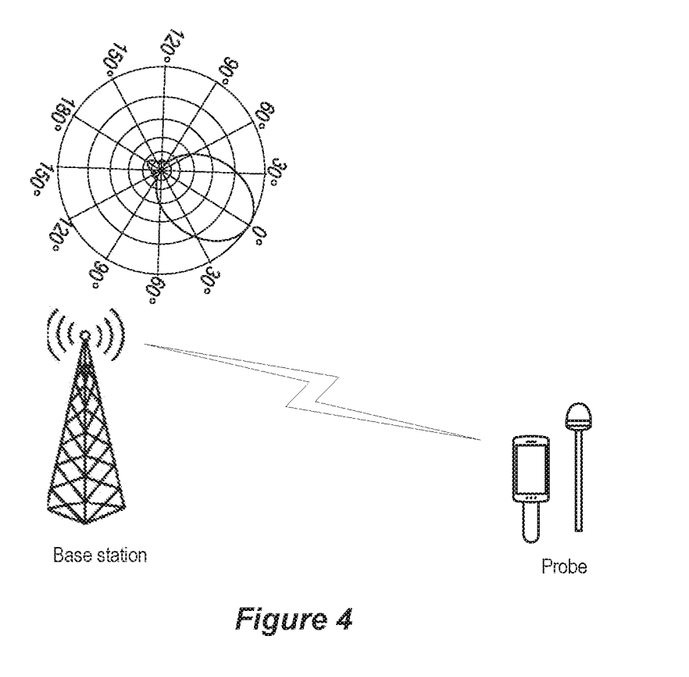
FIG. 4 schematically illustrates an example of EMF measurement with a conventional base station.

FIG. 4 is a conceptual diagram showing EMF measurement of a conventional non-AAS base station. As may be seen in FIG. 4, the base station antenna has a fixed beam pattern. Consequently, it is a simple matter to use a probe to sample and measure the EMF strength at a location of interest within the coverage area of the base station. The EMF strength at the location of interest may be represented as the received signal power, or signal intensity at the location of interest. In various embodiments, the EMF strength may be represented as the peak power or intensity at some instant in time, or alternatively an average power or intensity over a predetermined time period (such as, for example, a 6 minute time period).

Figure 5:
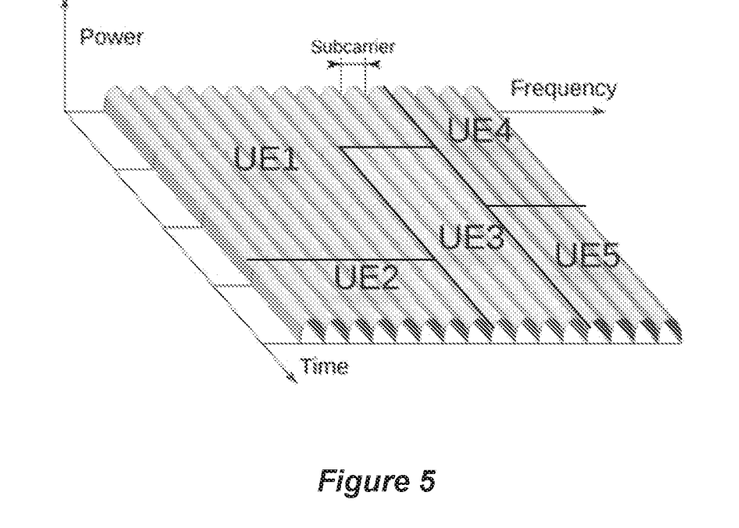
FIG. 5 schematically illustrates an example of time and frequency resources sharing.

FIG. 5 illustrates an example of time and frequency resources shared by multiple UEs. For the base station to transmit at maximum power, all of the time and frequency resources need to be occupied. In a conventional non-AAS base station, since the antenna beam pattern is fixed, the number of UEs sharing the resources doesn't impact EMF measurement provided that all of the radio resources are fully used.

Figure 6:
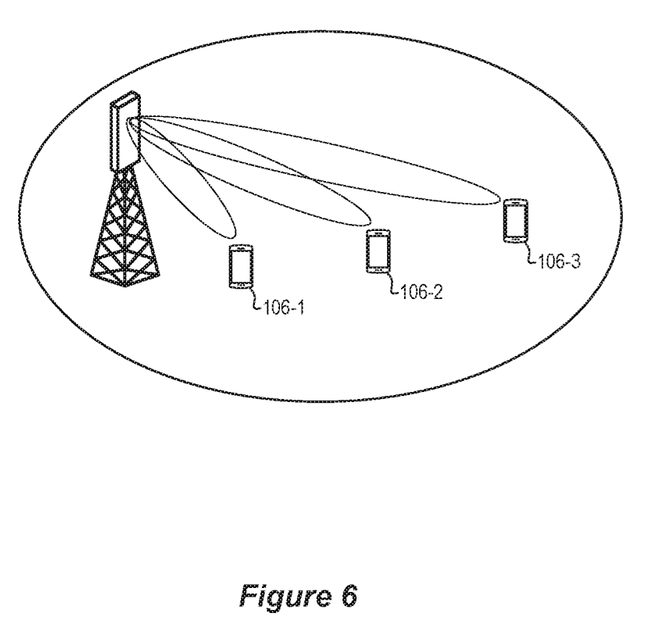
FIG. 6 schematically illustrates an example base station with 2D AAS and beamforming.

However, a 2D AAS of the type illustrated in FIG. 3 allows the base station to create multiple beams simultaneously, with each beam pointing at one UE as depicted in FIG. 6. In order to measure EMF strength for such a 2D AAS, not only must all the time and frequency resources need to be occupied, but also all of the radiated energy (i.e all of the beams) need to be directed to the location of the measurement probe.

Systems and methods are disclosed herein that enable in-the-field measurement of the electromagnetic field (EMF) of a radio unit 212 with a 2D AAS antenna 218.

In some embodiments, the base station may be controlled to transmit artificial traffic in time and frequency resources at a predefined loading level. For example, an Ericsson proprietary feature referred to as Air Interface Load Generator (AILG) may be used for this purpose. Combining this capability with customized beamforming weights it is possible to measure the EMF of a 2D AAS.

Figure 7:
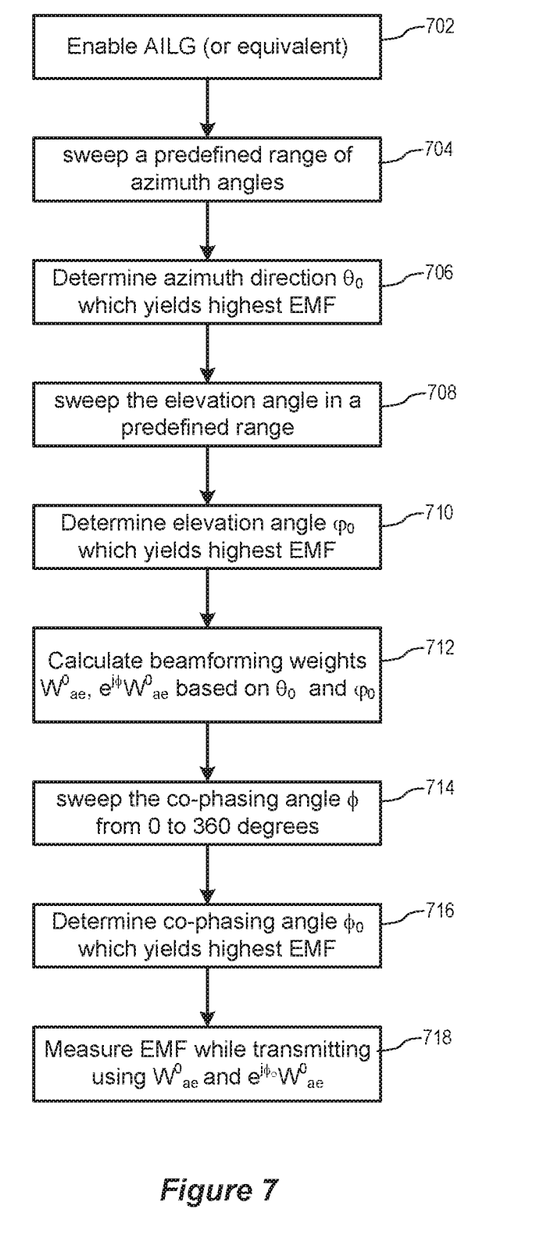
FIG. 7 is a flowchart illustrating an example process in accordance with representative embodiments of the present invention.

Referring to FIG. 7, in some embodiments, a process for measuring EMF may include the following steps:

Step 1 (at 702): AILG (or its equivalent) is enabled and the loading level configured to be 100%. This will ensure that the base station occupies all frequency and time resources.

Step 2 (at 704): Control the base station (or the radio unit) to sweep a predefined range of azimuth angles (e.g. with a predefined step size) by applying different sets of customized beamforming weights. In this step, the beamforming weights may be only applied to antenna elements with one polarization, in which case the antenna elements with the opposite polarization may be muted. The elevation beamform angle may also be fixed to a predefined angle.

Step 3 (at 706): Determine the azimuth direction $\theta_0$ which yields the highest EMF. For example, the EMF may be measured for each azimuth direction, and the azimuth direction $\theta_0$ which results in the strongest EMF is recorded.

Step 4 (at 708): Control the base station (or the radio unit) to sweep the elevation angle in a predefined range with a predefined step size, while keeping the azimuth beamforming direction to $\theta_0$. The beamforming weights may be applied to the antenna elements with the same polarization as in step 3, in which case the opposite polarization is muted.

Step 5 (at 710): Determine the elevation angle $\varphi_0$ which yields the highest EMF. For example, the EMF may be measured for each elevation angle, and the elevation direction $\varphi_0$ which results in the strongest EMF is recorded.

Step 6 (at 712): Calculate first beamforming weights corresponding to azimuth beamforming direction $\delta_0$ and elevation beamforming direction $\varphi_0$. These weights are denoted herein as $W_{ae}^0$, for one polarization (referred to as polarization #1) and $e^{j\varnothing}W_{ae}^0$ for the other polarization (referred to as polarization #2).

Step 7 (at 714): Control the base station (or the radio unit) to sweep the co-phasing angle $\varnothing$ from 0 to 360 degrees.

Step 8 (at 716): Determine the co-phasing angle $\varnothing_0$ that yields the highest EMF. For example, the EMF can be measured for each of the co-phasing angles, and the co-phasing angle $\varnothing_0$ that results in the strongest EMF is recorded. Using the recorded co-phasing angle $\varnothing_0$ that results in the strongest EMF, second beamforming weights $e^{j\varnothing_0}W_{ae}^0$ can be determined.

Step 9 (at 718): Control the base station (or the radio unit) to transmit at a load factor of 100% using $W_{ae}^0$ and $e^{j\varnothing_0}W_{ae}^0$, and measure EMF using a probe at a location of interest for a chosen duration.

As may be appreciated, the process described above with reference to FIG. 7 involves interaction between the base station (or its radio unit) and the probe at the location of interest. In some embodiments, this interaction may be implemented by means of a portable computer system associated with the probe, and in communication with the base station (or its radio unit) via a network, for example. For example, such a portable computer may compute beamforming weights and forward these to the base station to be applied in the radio unit. The portable computer may also receive EMF strength data from the probe, and determine the azimuth, elevation and co-phasing angles that yield the highest EMF.

In other networks, the probe may be configured to transmit EMF strength data to a predetermined location (such as a central management computer or the base station itself), which can then use the received EMF strength data to compute beamforming weights, and also to determine the azimuth, elevation and co-phasing angles that yield the highest EMF.

Figure 8:
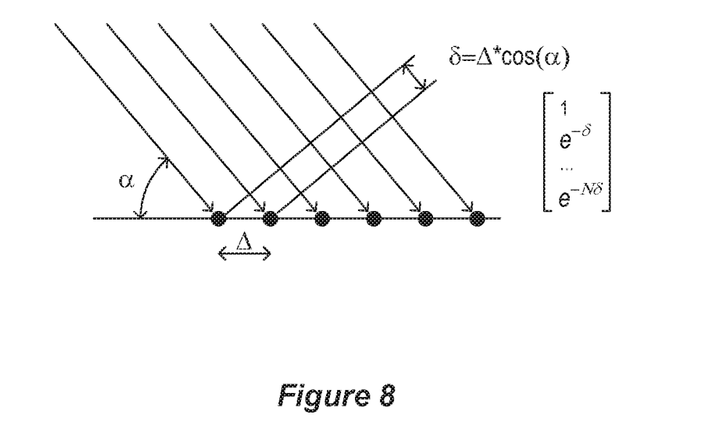
FIG. 8 schematically illustrates an example of beam steering with an AAS.

FIG. 8 schematically illustrates an example of beam steering with an AAS antenna. For a uniform linear array with N+1 elements as depicted in FIG. 8, a weighting vector:

$$w = [1, e^{-\delta}, e^{-2\delta}, \ldots e^{-N\delta}] \qquad \text{(Eq. 1)}$$

can be applied to the N+1 antenna elements to form a beam pointing to the direction α. In FIG. 8, Δ is the inter-element distance. δ is the inter-element phase difference, where $$\delta = \Delta * \cos(\alpha) \quad \text{(Eq. 2)}$$

Figure 9:
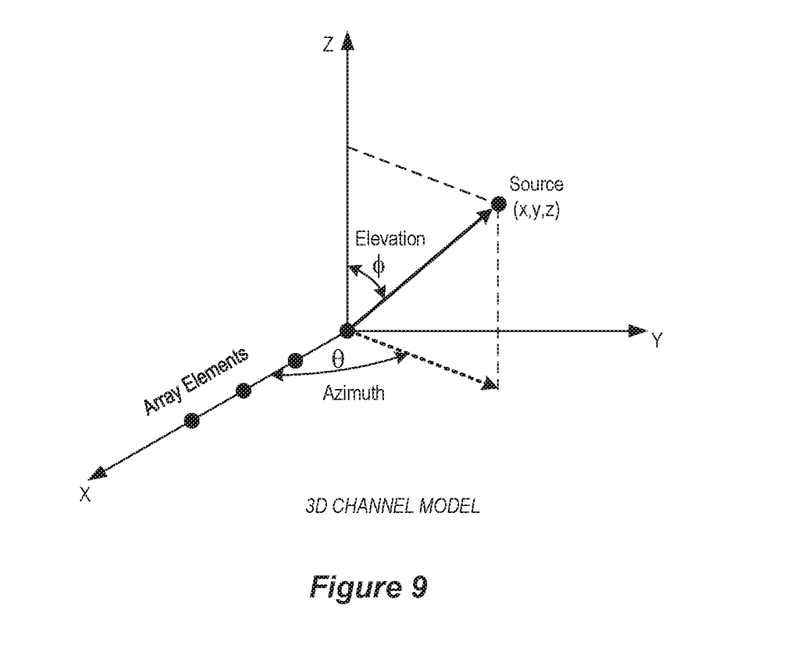
FIG. 9 schematically illustrates an example 3D beamforming model.

2D AAS antennas used in 4G and 5G can be modelled as a 2D antenna array consisting of C+1 columns and R+1 rows of cross-polarized elements. ±45 degrees cross-polarization is a widely used configuration. The 2D antenna array can steer the beam in both azimuth and elevation directions. Consider an example in which the antenna needs to form a beam to a point (x, y, z) (see FIG. 9). A weighting vector:

$$w_a = [1, e^{-\delta_a}, e^{-2\delta_a}, \ldots e^{-C\delta_a}] \quad \text{(Eq. 3)}$$

forms a horizontal beam with azimuth equal to θ, where in Eq. 3:

$$\delta_a = \Delta_a * \cos(\theta)$$

$\Delta_a$ is inter-column distance of the antenna.

Likewise, weighting vector $w_e$ allows forming of a beam with elevation angle φ, $$w_e = [1, e^{-\delta_e}, e^{-2\delta_e}, \ldots e^{-C\delta_e}] \quad \text{(Eq. 4)}$$

Where:

$$\delta_e = \Delta_e * \cos(\varphi)$$

$\Delta_e$ is the inter-row distance of the antenna.

A weighting matrix $$W_{ae} = w_a \otimes w_e \quad \text{(Eq. 5)}$$

forms a beam with azimuth θ and elevation φ, where ⊗ denotes the Kronecker product.

Beam steering can be applied to each polarization independently using equations 3-5 above.

Figure 10:
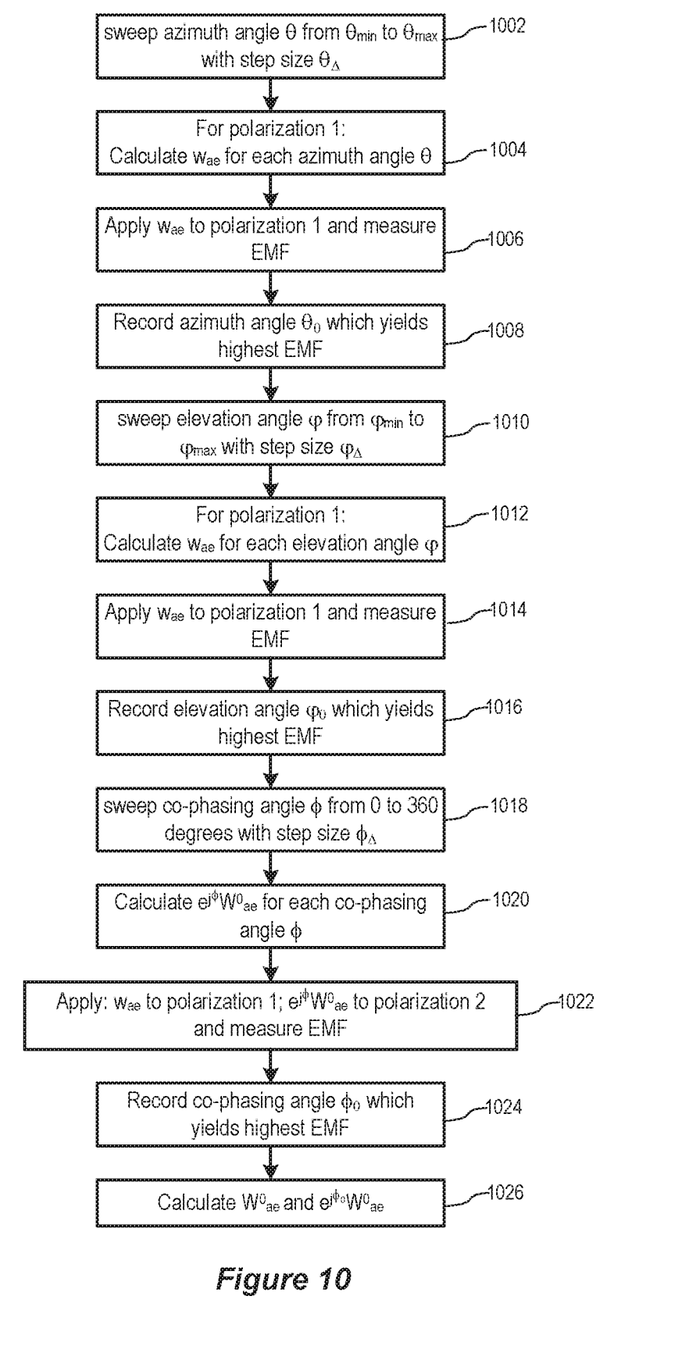
FIG. 10 is a flowchart illustrating another example process in accordance with representative embodiments of the present invention.

FIG. 10 is a flow-chart illustrating an example process for identifying azimuth and elevation angles ($\theta_O$, $\varphi_O$), that produce the strongest EMF at the location of interest. The example process of FIG. 10 proceeds according to the following steps:

Step 1 (at 1002): Control the base station (or the radio unit) to sweep the azimuth angle θ from $\theta_{min}$ to $\theta_{max}$ with step size $\theta_\Delta$ while keeping φ to 0.

Step 2 (at 1004): For one polarization (e.g. +45 degrees), and for each azimuth angle θ, calculate $w_a$ using Eq. 3 and $W_{ae}$, weighting matrix for the same polarization antenna elements, using Eq. 5 and assuming elevation angle φ is 0.

Step 3 (at 1006): Control the base station (or the radio unit) to apply $W_{ae}$ and measure the EMF when AILG is running at 100% loading. The opposite polarization (−45 degrees) may be muted by applying an all-zero weighting matrix to the antenna elements with −45 degrees polarization.

Step 4 (at 1008): Record $\theta_0$, the azimuth direction that produces the strongest EMF measurement.

Step 5 (at 1010): Control the base station (or the radio unit) to sweep the elevation angle φ from $\varphi_{min}$ to $\varphi_{max}$ with step size $\varphi_\Delta$ while keeping azimuth angle to $\theta_0$ Step 6 (at 1012): For the same polarization (e.g. +45 degrees), and for each φ, calculate $w_e$ using Eq. 4 and $W_{ae}$ according to Eq. 5.

Step 7 (at 1014): Control the base station (or the radio unit) to apply $W_{ae}$ and measure the EMF at the point of interest when AILG is running at 100% loading. The opposite polarization (−45 degrees) is muted by applying an all-zero weighting matrix to the antenna elements with −45 degrees polarization.

Step 8 (at 1016): Record $\varphi_0$, the direction that results in the strongest EMF measurement.

Step 9 (at 1018): With ($\theta_0$, $\varphi_0$) identified and fixed, control the base station (or the radio unit) to sweep Ø, a co-phasing angle from 0 to 360 degrees with step $\theta_\Delta$.

Step 10 (at 1020): For each co-phasing angle Ø, calculate $W_{ae}$ using Eq. 5, and $e^{j\emptyset}W_{ae}$;

Step 11: (at 1022): Control the base station (or the radio unit) to apply $W_{ae}$ to the antenna elements of polarization 1 (e.g. with +45 degrees polarization), and apply $e^{j\emptyset}W_{ae}$ to polarization 2 (e.g. with −45 degrees polarization). Measure the EMF at the point of interest with AILG running at 100% loading level.

Step 12 (at 1024): Record $\emptyset_0$, the co-phasing angle that results in the strongest EMF measurement.

Step 13 (at 1026): Finally, calculate $W_{ae}^0$ and $e^{j\emptyset_0}W_{ae}^0$ using Eq. 5 and assuming θ=$\theta_0$, φ=$\varphi_0$, Ø=$\emptyset_0$.

Subsequently, the base station (or radio unit) can be controlled to apply $W_{ae}^0$ to antenna elements with +45 polarization and $e^{j\emptyset_0}W_{ae}^0$ to antenna elements with −45 polarization. While the base station is transmitting (AILG running at 100% loading level), the EMF can be measured using a probe at a location of interest for a chosen duration.

Figure 11:
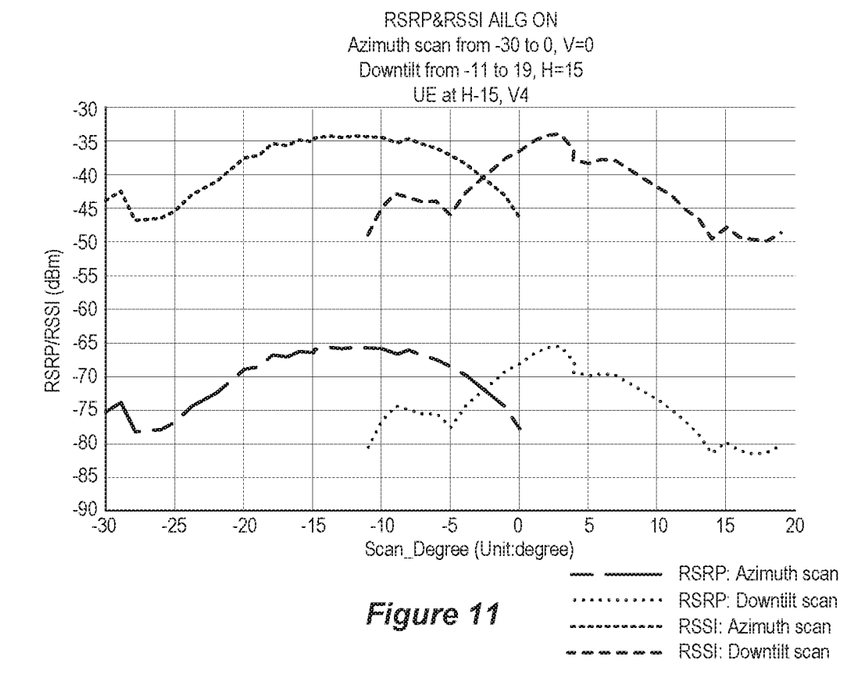
FIG. 11 schematically illustrates an example over-the-air test: azimuth and elevation scan.
Figure 12:
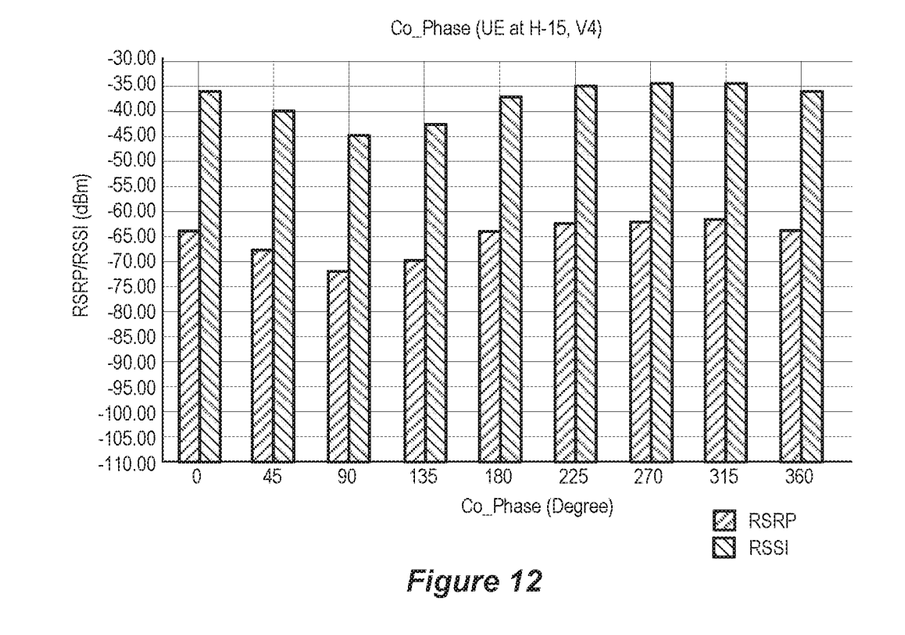
FIG. 12 is a chart illustrating an example co-phase scan over-the-air test results obtained using techniques in accordance with embodiments of the present invention.

FIGS. 11 and 12 illustrate an example over-the-air test using the process described above. In the test, a probe was located at azimuth −15 degrees and elevation 4 degrees. The top left curve in FIG. 11 shows the RSSI (Received Signal Strength Indicator) detected by the probe when scanning azimuth in the range of −30 degrees to 0 degrees. RSSI is a measurement of total received power. Downtilt scan (elevation scan) results are plotted on the top right of FIG. 10.

FIG. 12 depicts co-phase scan results when azimuth beamforming angle is set to −15 degrees, and elevation beamforming angle is set to 4 degrees. As shown in FIG. 12, 270 degrees co-phasing produces the strongest power.

As may be appreciated, embodiments of the present invention may provide any one or more of the following:
The generation of Beamformed Air Interface Load (BAIL)
Methods in finding the highest EMF level in the field including:
AoA sweeping in single or dual polarization
Co-phasing sweeping
directing all possible energy from an AAS system towards a specific direction for arbitrary duration.

While processes in the figures may show a particular order of operations performed by certain embodiments of the present disclosure, it should be understood that such order is representative, and that alternative embodiments may perform the operations in a different order, combine certain operations, overlap certain operations, etc.

Those skilled in the art will recognize improvements and modifications to the embodiments of the present disclosure. All such improvements and modifications are considered within the scope of the concepts disclosed herein.

What is claimed is:

1. A method for in-the-field measurement of electromagnetic field, EMF, strength at a point of interest in a coverage area of a 2-dimensional (2D) advanced antenna system (AAS), the method comprising steps of:
causing the 2D AAS to transmit with a load factor of 100 percent;
causing the 2D AAS to sweep a predefined range of azimuth angles, and determining an azimuth direction $\Theta_o$ which yields highest EMF at the point of interest;

causing the 2D AAS to sweep a predefined range of elevation angles, and determining an elevation angle $\varphi_0$ which yields highest EMF at the point of interest;

determining first beamforming weights based on $\Theta_o$ and $\varphi_0$, and causing the 2D AAS to apply the first beamforming weights;

causing the 2D AAS to sweep a co-phasing angle $\phi$ from 0 to 360 degrees, and determining a co-phasing angle $\phi_0$ which yields highest EMF;

determining second beamforming weights based on $\Theta_o$, $\varphi_0$ and $\phi_0$, and causing the 2D AAS to apply the second beamforming weights; and causing the 2D AAS to transmit at a load factor of 100% using the first beamforming weights and the second beamforming weights and measuring the EMF strength at the point of interest.

2. A computer system comprising circuitry configured to implement a method for in-the-field measurement of electromagnetic field, EMF, strength at a point of interest in a coverage area of a 2-dimensional (2D) advanced antenna system (AAS), the method comprising steps of:

causing the 2D AAS to transmit with a load factor of 100 percent;

causing the 2D AAS to sweep a predefined range of azimuth angles, and determining an azimuth direction $\Theta_o$ which yields highest EMF at the point of interest;

causing the 2D AAS to sweep a predefined range of elevation angles, and determining an elevation angle $\varphi_0$ which yields highest EMF at the point of interest;

determining first beamforming weights based on $\Theta_o$ and $\varphi_0$, and causing the 2D AAS to apply the first beamforming weights;

causing the 2D AAS to sweep a co-phasing angle $\phi$ from 0 to 360 degrees, and determining a co-phasing angle $\phi_0$ which yields highest EMF;

determining second beamforming weights based on $\Theta_o$, $\varphi_0$ and $\phi_0$, and causing the 2D AAS to apply the second beamforming weights; and causing the 2D AAS to transmit at a load factor of 100% using the first beamforming weights and the second beamforming weights and measuring the EMF strength at the point of interest.

3. The computer system as claimed in claim 2, wherein determining the first beamforming weights comprises calculating the first beamforming weights such that the 2D AAS will generate a beam directed at the elevation angle $\varphi_0$ and elevation angle $\varphi_0$ which yield the highest EMF at the point of interest.

4. The computer system as claimed in claim 2, wherein determining the second beamforming weights comprises calculating the second beamforming weights such that the 2D AAS will generate a beam having a co-phasing angle $\phi_0$ which yields the highest EMF at the point of interest.

5. The computer system as claimed in claim 2, further comprising:

a probe configured to measure the electromagnetic field strength at the point of interest; and an interface configured to enable communication between the computer system and the 2D AAS via a network.

6. The computer system as claimed in claim 5, wherein measuring the EMF strength at the point of interest comprises controlling the probe to measure the EMF for a predetermined period of time.

7. The computer system as claimed in claim 5, wherein the computer system is any one of:

a user equipment, UE, device; and a portable network test computer system.

8. The computer system as claimed in claim 2, further comprising:

a first interface configured to enable communication between the computer system and a probe configured to measure the EMF strength at the point of interest; and a second interface configured to enable communication between the computer system and the 2D AAS via a network.

9. The computer system as claimed in claim 8, wherein the computer system is any one of:

a base station associated with the 2D AAS;

a network node of a wireless communications network including the 2D AAS; and a network management system of the wireless communications network.

* * * * *